(12) United States Patent
O'Boyle

(10) Patent No.: US 6,336,371 B1
(45) Date of Patent: Jan. 8, 2002

(54) VILLARI EFFECT SEATBELT TENSION SENSOR

(75) Inventor: Michael E. O'Boyle, Brighton, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 09/196,093

(22) Filed: Nov. 19, 1998

Related U.S. Application Data

(60) Provisional application No. 60/067,071, filed on Nov. 20, 1997, and provisional application No. 60/035,149, filed on Jan. 9, 1997.

(51) Int. Cl.$^7$ .............................................. G01N 19/00
(52) U.S. Cl. .................................................... 73/865.9
(58) Field of Search .......................... 73/865.9, 862.69, 73/862.331, 862.391, 862.336; 280/735, 806; 340/457.1, 43 B

(56) References Cited

U.S. PATENT DOCUMENTS

| | | | |
|---|---|---|---|
| 3,618,378 A | | 11/1971 | Shull et al. ............ 73/862.474 |
| 5,181,739 A | * | 1/1993 | Bauer et al. ........... 73/862.391 |
| 5,739,757 A | * | 4/1998 | Gioutsos ..................... 340/667 |
| 5,767,766 A | * | 6/1998 | Kwun ........................ 340/436 |
| 5,905,210 A | * | 10/1999 | O'Boyle et al. ........ 73/862.331 |
| 5,960,523 A | | 10/1999 | Husby et al. ................. 24/633 |
| 5,965,827 A | * | 10/1999 | Stanley et al. ......... 73/862.391 |
| 5,996,421 A | | 12/1999 | Husby ................... 73/862.451 |
| 6,081,759 A | | 6/2000 | Husby et al. ................. 701/45 |

* cited by examiner

Primary Examiner—Benjamin R. Fuller
Assistant Examiner—Octavia Davis
(74) Attorney, Agent, or Firm—Dinnin & Dunn P.C.

(57) ABSTRACT

A Villari effect seatbelt tension sensor 10 comprises a sensor housing 50 having a plunger chamber 52 and a tongue head flange chamber 54 therein. The two chambers 52 and 54 are separated by a radial flange 58 extending therebetween defining a passage connecting the chambers. A Villari effect sensor 12 is disposed axially within the sensor housing 50 and is secured on one end 16 to a plunger 40 disposed within the plunger chamber 52 and secured on the opposite end 14 to a tongue head flange 20 disposed within the tongue head flange chamber 54. A tongue 24 connected by a shaft 28 to the tongue head flange 20 has a slot 26 therein for securing a seatbelt 80 thereto.

7 Claims, 1 Drawing Sheet

VILLARI EFFECT SEATBELT TENSION SENSOR

CROSS-REFERENCE TO RELATED APPLICATIONS

The instant application claims the benefit of U.S. Provisional Application Serial No. 60/067,071 filed Nov. 20, 1997, commonly assigned with the present invention.

This application is related to U.S. Provisional Application Serial No. 60/035,149, filed Jan. 9, 1997, commonly assigned with the present invention.

BACKGROUND OF THE INVENTION

The instant invention relates to a seatbelt tension sensor system that employs a Villari effect sensor to measure tension in an automotive passenger restraint belt (seatbelt) application. Specifically, this invention provides a seatbelt tension sensor system which is rugged, insensitive to changes in temperature, and provides analog tension measurement at a high sampling rate.

The measurement of seatbelt tension is desirable in a wide variety of situations. Seatbelt tension measurements may be used to trigger seatbelt pretensioners, to modify airbag inflation profiles based upon the severity of a collision, and to measure any forward acceleration of a seat occupant, thereby allowing other collision related forces to be calculated. Additionally, seatbelt tension measurements may be used in conjunction with a seat weight sensor to ascertain the presence of an infant seat in an automobile.

A vehicle may contain automatic safety restraint actuators that are activated responsive to a vehicle crash for purposes of mitigating occupant injury. Examples of such restraint actuators include air bags, seatbelt pretensioners, and deployable knee bolsters.

One objective of an automatic safety restraint system is to mitigate occupant injury, thereby not causing more injury with the automatic restraint system than would be caused by the crash had the automatic restraint system not been activated. Notwithstanding the protective benefit of these automatic safety restraint actuators, there is generally both a risk and a cost associated with the deployment thereof. Generally, it is desirable to only activate automatic safety restraint actuators when needed to mitigate injury because of the expense of replacing the associated components of the safety restraint system, and because of the potential for such activations to harm occupants. This is particularly true of air bag restraint systems, wherein occupants too close to the air bag at the time of deployment—i.e. out-of-position occupants—are vulnerable to injury or death from the deploying air bag even when the associated vehicle crash is relatively mild. Moreover, occupants who are of small stature or with weak constitution, such as children, small adults or people with frail bones are particularly vulnerable to injury induced by the air bag inflator. Furthermore, infants properly secured in a normally positioned rear facing infant seat (RFIS) in proximity to a front seat passenger-side air bag are also vulnerable to injury or death from the deploying air bag because of the close proximity of the infant seat's rear surface to the air bag inflator module.

Therefore, it is desirable to determine the presence of an infant seat in an automobile to inhibit the actuation of the airbag inflator. It has been demonstrated that when securing an infant seat to an automobile seat, seatbelt tension is often considerably higher than when adult or "normal sized" occupants are wearing the seatbelt. Individuals wearing seatbelts will rarely tighten a seatbelt above 10 pounds of seatbelt tension under normal operating conditions. In contradistinction, tests have shown that seatbelt tensions used to secure infant seats are as high as 50 pounds. In systems so equipped, high seatbelt tension can induce artificially high readings in a seat weight sensor by forcing the infant seat down into a seat pad used to sense the weight of an occupant on the seat. Therefore, when abnormally high seatbelt tension exists in combination with a high seat weight reading the presence of an infant seat may be deduced and the inflation profile of an airbag modified accordingly.

Known seatbelt tension measurement systems generally include spring-loaded contact sensors and load cells. Spring-loaded contact sensors provide only threshold weight detection, that is whether tension on the belt is above or below a certain threshold determined by the spring. Load cells provide moderately reliable analog tension measurement but are expensive, require periodic calibration, are easily damaged by off-axis loads, and have output readings that vary significantly with changes in temperature. Additionally, many load cell analog outputs signals are the product of an electronic summing junction that may induce time delays in obtaining a tension measurement thereby rendering the measurement unsuitable for a time-critical operation such as inhibiting the deployment of a passenger restraint.

SUMMARY OF INVENTION

In accordance with the present invention a seatbelt tension measurement system employing a Villari effect sensor is provided. This system provides a mechanism to transfer tensile force acting on the seatbelt to the Villari effect sensor thereby generating an electrical signal responsive to the amount of tension present in a seatbelt. A sensor housing is provided which encloses the Villari effect sensor and allows axial movement of a tongue secured thereto. The seatbelt tension sensor transfers all of the tensile force acting on the seatbelt to the Villari effect sensor thereby obviating the effects of friction thereon.

The present invention provides a tension measurement system which is relatively uncomplicated in design, insensitive to variations in temperature, does not require periodic calibration, is not affected by off-axis loads, and can provide tension values at extremely high sampling rates. The instant invention also has the added advantage of being inexpensive to produce in comparison with, for example, load cell technology. Another feature of the instant invention is the ability to locate the sensor in several locations in the seatbelt system, depending on vehicle design requirements.

In addition, the output of the present invention can be used to determine rates of deceleration in the event of a collision and can be used in concert with a seat weight sensor to determine the presence of an infant seat.

Accordingly, one object of the instant invention is to provide a seatbelt tension sensor that is capable of being incorporated into an airbag control system for determining the presence of an infant seat or other non-adult item in a vehicle seat.

Another object of the instant invention is to provide a seatbelt tension sensor that is rugged, and insensitive to changes in temperature.

Yet another object of the instant invention is to provide a seatbelt tension sensor that is inexpensive to produce.

A yet further object of the instant invention is to provide a seatbelt tension sensor that may be placed in several positions within a vehicle seatbelt system depending on design requirements.

A yet further object of the instant invention is to provide a seatbelt tension sensor employing a Villari effect sensor to provide an analog tension indication to a passenger restraint control system.

The instant invention will be more fully understood after reading the following detailed description of the preferred embodiment with reference to the accompanying drawing figures.

DETAILED DESCRIPTION OF THE PREFERRED EMBODIMENT

Figure 1:
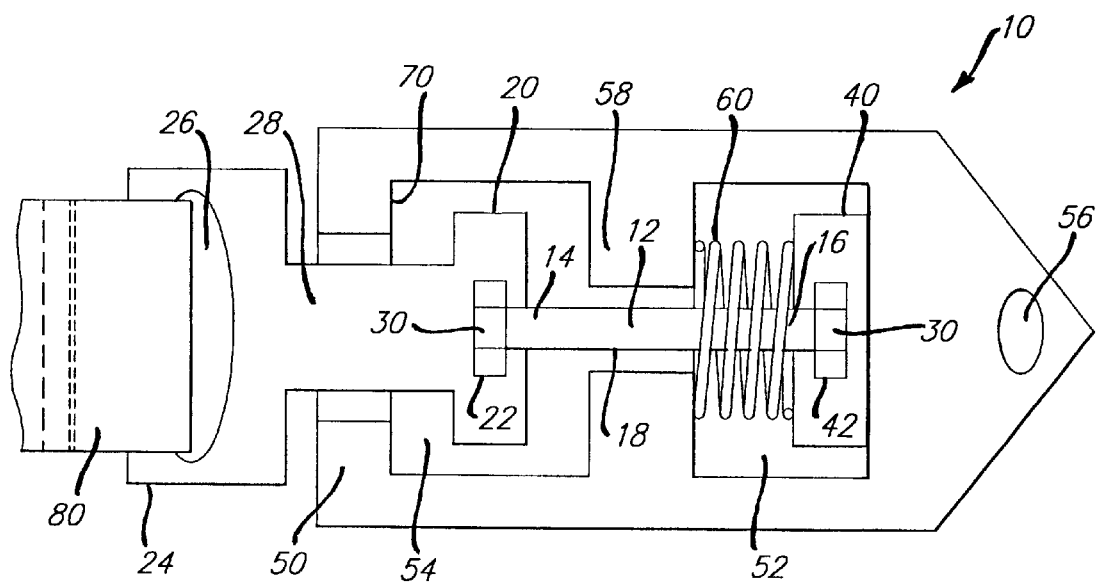
FIG. 1 is a diagrammatic illustration of a Villari effect seatbelt tension sensor in accordance with the instant invention.

The seat weight sensor of the present invention operates by utilizing the principal that the magnetic permeability of certain materials varies under the application of mechanical stress applied to the material. This principal is known as the Villari effect.

More specifically, the Villari or "inverse Joule magnetoelastic" effect was discovered and studied by Joule and Villari in the mid 1800's. The Villari effect phenomenon occurs in ferromagnetic materials and is characterized by a change in the magnetic permeability of the material when subjected to stress. That is, the ability to magnetize the material depends upon the level of stress applied to the material. The Villari effect is closely related to the magnetostriction phenomenon. Magnetostriction (often called "Joule magnetostriction") characterizes the expansion or contraction of a ferromagnetic material under magnetization. Positive magnetostrictive materials expand parallel to the direction of the magnetic field when magnetized, whereas negative magnetostrictive materials contract in the direction parallel the magnetic field when magnetized.

Materials which exhibit magnetostrictive properties will also exhibit the Villari effect. Materials with a positive magnetostriction coefficient suffer a decrease in magnetic permeability when subjected to compressive stresses, and will exhibit an increase in permeability when subjected to tensile stresses. The reverse occurs in negative magnetostrictive materials, i.e., permeability increases when compressive stresses are applied and decreases upon the application of tensile stress. This change in permeability or response magnetization of the material when stress is applied thereto is referred to as the Villari effect.

Examples of positive magnetostrictive materials include iron, vanadium permendur (49% iron, 49% cobalt, 2% vanadium), or the permalloy (Nickel-iron) series of alloys. Terfenol-D is a ceramic material consisting of iron, terbium, and dysprosium specifically formulated to have an extremely high positive magnetostriction. Nickel is an example of a material with a negative magnetostriction coefficient. If a metallic alloy is used, the material must be properly annealed in order to remove work hardening effects and to ensure reasonable uniformity of the sensing material.

The seatbelt tension sensor of the instant invention is arranged to measure tensile forces, and as described more fully hereinbelow, is applicable to a tension measuring Villari effect sensor. Initially, an appropriate magnetostrictive material must be selected to measure tensile forces acting on the seatbelt. When measuring tensile forces it is preferred that the material have a negative magnetostrictive coefficient so as to exhibit a decrease in permeability in the presence of a tensile force. The sign of the magnetostriction coefficient is chosen so that the sensor operates in a region of decreasing magnetic permeability. Generally, a sensor which utilizes a decreasing permeability with increased force will have a much greater dynamic range and will provide a signal which varies more linearly with applied force than one which utilizes increasing permeability as force is applied.

Known in the art Villari effect sensors are constructed from a sensing rod comprised of magnetostrictive material enclosed by a drive coil having an alternating drive current applied thereto that creates an alternating magnetic field through the material. A plurality of sense coils are also wrapped around the material to provide output signals proportional to the derivative of the magnetic flux within the magnetostrictive material. The output signals are operatively coupled to a control processor that is suitably programmed to perform various functions associated with the control of a passenger restraint system, for example, inhibiting the deployment of an airbag.

FIG. 1 illustrates a Villari effect seatbelt tension sensor 10 in accordance with a preferred embodiment of the present invention. The seatbelt tension sensor 10 comprises a Villari effect sensor 12 having an axially disposed magnetostrictive sensor rod 18 with a first end 14 secured to a tongue head flange 20 by a first anchor 30. A second end 16 of the Villari effect sensor rod 18 is secured to a plunger 40 by a second anchor 30. The anchors 30 can be comprised of a nonmetallic material, for example Teflon® or delrin® that will not materially affect the magnetic fields present in the sensor 12. Both the tongue head flange 20 and the plunger 40 have anchor holes 22 and 42 therein, shaped to accept the anchors 30. The sensor rod 18 ends may be secured to the tongue head flange 20 and the plunger 40 by any suitable nonmetallic fastener.

A sensor housing 50 encloses a plunger chamber 52 and a tongue head chamber 54 arranged axially therein. The sensor housing 50 further has a mounting bolt hole 56 at one end for attaching the seatbelt tension sensor 10 to the frame or other suitable structural member of a vehicle. A spring 60 is disposed coaxially about the Villari effect sensor rod 18 and abuts the plunger 40 on one end and on the other end abuts a sensor housing radial flange 58 that extends inwardly between the plunger chamber 52 and the tongue head chamber 54. The radial flange 58 has a width that is greater than the width of the plunger 40 to prevent the plunger 40 from moving axially past the flange 58. The radial flange 58 also defines a passage connecting the plunger chamber 52 with the tongue head chamber 54.

The sensor housing plunger chamber 52 is disposed about the plunger 40, the spring 60, and the second end 16 of the sensor rod 18. The sensor housing tongue head chamber 54 is separated from the plunger chamber 52 by the housing radial flange 58 and is disposed about the tongue head flange 20, the first end 14 of the sensor rod 18, and an axially extending tongue shaft 28. The tongue head chamber 54 is further provided with a sensor housing lip 70 disposed on the opposite end of the sensor housing 50 from the mounting bolt hole 56, that defines a passage through which the tongue shaft 28 extends.

The sensor rod 18, the plunger 40 and the tongue head flange 20 are axially movable within the sensor housing 50.

The spring 60 biases the plunger 40 in the opposite direction of tensile force applied by a seatbelt 80 acting thereon. The sensor housing lip 70 abuts the tongue head flange 20 preventing further axial motion thereof in the event of sensor rod 18 breakage, thereby ensuring that the seatbelt will remain securely attached to the sensor 10. A tongue 24, disposed on the exterior of the sensor housing 50, extends from the tongue shaft 28 and is provided with a slot 26 therethrough, for securing a seatbelt 80 thereto.

Figure 2:
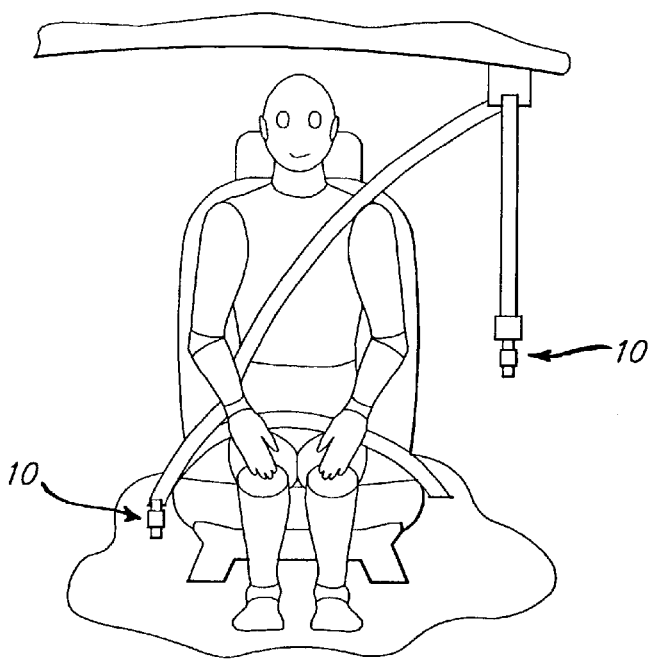
FIG. 2 is an illustration of possible placement of the seatbelt tension sensor in an automobile.

Referring to FIG. 2, the Villari effect seatbelt tension sensor 10 may be positioned in a plurality of positions in a conventional seatbelt system, depending upon design requirements. In operation, as the seatbelt 80 tension increases, the plunger 40 is axially displaced, thereby compressing the spring 60 against the sensor housing radial flange 58. All of the tensile force is borne by the Villari effect sensor rod 18, thereby changing the magnetic permeability thereof. The movement of the plunger 40, the spring 60, and the sensor rod 18 within the plunger chamber 52 ensures that tensile force is applied only to the sensor rod 18 and not dissipated by frictional forces. As the magnetic permeability of the sensor 10 changes, the Villari effect sensor provides outputs responsive to the amount of tensile force acting on the sensor rod 18 to a control processor for use in controlling a passenger restraint actuation system.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. A seatbelt tension sensor comprising:
   a sensor housing having a plunger chamber and a tongue head chamber therein connected by a passage defined by a radial flange extending inwardly therebetween, said sensor housing further having a mounting bolt hole on a one end thereof, and a housing lip on an opposed end thereof defining a passage therein;
   a plunger having an anchor hole therein, said plunger disposed within said sensor housing plunger chamber;
   a tongue head flange disposed within the tongue head chamber having an anchor hole therein and a tongue shaft extending axially therefrom through the passage defined by the housing lip of said sensor housing;
   a tongue extending from the tongue shaft having a slot therein for securing said seatbelt thereto;
   a Villari effect sensor comprising an axially disposed magnetostrictive material having first and second ends, said first and second ends having respective first and second anchors secured thereto, wherein said first anchor is disposed in the anchor hole of said plunger and said second anchor is disposed in the anchor hole of said tongue head flange; and
   a spring having a first end and a second end, said spring disposed coaxially about said Villari effect sensor, wherein the first end of said spring abuts said plunger and the second end of said spring abuts said sensor housing radial flange.

2. The seatbelt tension sensor as claimed in claim 1 wherein said Villari effect sensor anchors are comprised of a nonmetallic material.

3. The seatbelt tension sensor as claimed in claim 1 wherein said Villari effect sensor magnetostrictive material has a negative magnetostrictive coefficient.

4. The seatbelt tension sensor as claimed in claim 1 wherein said Villari effect sensor magnetostrictive material is comprised of nickel.

5. A seatbelt tension sensor comprising:
   a sensor housing having a plunger chamber and a tongue head chamber therein connected by a passage defined by a radial flange extending inwardly therebetween, said sensor housing further having a first end and a second end, said first end having a mounting bolt hole therein, and a housing lip disposed on the second end defining a passage therein;
   a plunger disposed within said sensor housing plunger chamber;
   a tongue head flange disposed within the tongue head chamber having a tongue shaft extending axially therefrom through the passage defined by the housing lip of said sensor housing;
   a tongue extending from the tongue shaft having a slot therein for securing said seatbelt thereto;
   a Villari effect sensor comprising an axially disposed magnetostrictive material having first and seconds ends secured to said plunger and said tongue head flange respectively; and
   a spring having a first and a second end, said spring disposed coaxially about said Villari effect sensor, wherein the first end of said spring abuts said plunger and the second end of said spring abuts said sensor housing radial flange.

6. The seatbelt tension sensor as claimed in claim 5 wherein said Villari effect sensor magnetostrictive material has a negative magnetostrictive coefficient.

7. The seatbelt tension sensor as claimed in claim 5 wherein said Villari effect sensor magnetostrictive material is comprised of nickel.

* * * * *